United States Patent [19]

Spinner et al.

[11] Patent Number: 4,808,124
[45] Date of Patent: Feb. 28, 1989

[54] COAXIAL-LINE CONNECTOR

[75] Inventors: Georg Spinner, Feldkirchen-Westerham; Franz-Xaver Pitschi, Rottach-Egern, both of Fed. Rep. of Germany

[73] Assignee: Spinner GmbH, Elektrotechnische Fabrik, Munich, Fed. Rep. of Germany

[21] Appl. No.: 126,605

[22] Filed: Nov. 30, 1987

[30] Foreign Application Priority Data

Dec. 2, 1986 [DE] Fed. Rep. of Germany ....... 3641088

[51] Int. Cl.$^4$ .............................................. H01R 17/18
[52] U.S. Cl. .................................. 439/578; 439/891; 439/908; 439/801
[58] Field of Search .................. 439/578–585, 439/675, 650, 651–655, 891, 908, 799, 800, 806, 807, 810–817, 801

[56] References Cited

U.S. PATENT DOCUMENTS

| | | | |
|---|---|---|---|
| 3,354,420 | 11/1967 | Mineek | 439/584 |
| 3,437,982 | 4/1969 | O'Keefe et al. | 439/578 |
| 3,500,296 | 3/1970 | O'Keefe et al. | 439/585 |
| 3,502,035 | 3/1970 | Lazar et al. | 439/578 |
| 3,675,181 | 7/1972 | Lankford et al. | 439/581 |
| 3,781,771 | 12/1973 | Blake | 439/583 |
| 4,502,749 | 3/1985 | Forney, Jr. et al. | 439/581 |

Primary Examiner—David Pirlot
Attorney, Agent, or Firm—Henry M. Feiereisen

[57] ABSTRACT

A coaxial-line connector includes a jack having an outer conductor and an inner conductor part divided in at least two segments and arranged in said outer conductor. Clamped in the inner conductor part defining the jack is an inner conductor part forming the plug. At least one pressing screw is arranged in a radial bore of the outer conductor to exert a radial clamping force on the segments to attain a reliable and tension-proof connection between the inner conductor parts. The setscrew is accessible so as to allow an adjustment of the clamping force.

17 Claims, 2 Drawing Sheets

COAXIAL-LINE CONNECTOR

BACKGROUND OF THE INVENTION

The present invention refers to a coaxial-line connector.

When referring to coaxial-line connectors, detachable connectors like e.g. plugs and couplings, as well as nondetachable connectors which are used e.g. for permanent connection of two lines or cables, for bushings or the like, are to be understood.

There is known a coaxial-line connector which includes a jack and a plug cooperating with each other for connecting the respective cable inner conductors. The jack is constituted bu one inner conductor part which is divided in at least two segments through axis parallel slots and clamps the other inner conductor part which constitutes the plug. In order to provide the clamping force, an axially displaceable pressure ring is used which is provided with a conical surface cooperating with a mating conical surface at the free end of the segmented inner conductor part of the jack.

Practice has shown, however, that such a connector cannot attain a sufficient tension-proof clamping of the inner conductor part forming the plug (usually the exposed end of a cable inner conductor) within the inner conductor part forming the jack (generally the cable connecting side of a connector or the like). This is especially true when considering that it is very difficult to initially determine and maintain during assembly the force to be axially applied onto the pressure ring for providing a predetermined radial clamping force. Moreover, the axially displaceable pressure ring must be made of a plastic material which has a tendency to cold flow and a strength which is dependent on the temperature.

SUMMARY OF THE INVENTION

It is thus on object of the invention to provide an improved coaxial-line connector obviating the aforestated drawbacks.

This object and others which will become apparent hereinafter are attained in accordance with the present invention by providing at least one accessible pressing screw which radially extends through the outer conductor of the jack and exerts a radial clamping force onto the segments of the inner conductor part.

The provision of at least one radial pressing screw e.g. a setscrew arranged in a suitable radial bore of the outer conductor and exerting pressure on the inner conductor part of the jack allows a high and yet controllable clamping force and thus accomplishes a reliable and highly tension-proof connection of the inner conductor parts in a simple and yet reliable manner without interference of the characteristic impedance.

The pressing screw may be made of insulating material, preferably ceramics, and supported by an insulating ring surrounding the inner conductor part forming the jack.

Preferable, however, is a pressing screw of metal which is arranged in the radial bore of the outer conductor and cooperates with an insulating element the one end of which being contacted by the pressing screw and the other end of which bearing against the inner conductor part of the jack. In this case, the pressing screw has about the thickness of the outer conductor. The insulating element may be an insulating pin which is connected in force-locking manner, e.g. through gluing, with the pressing screw and is preferably made of ceramic material.

According to a further feature of the present invention, the inner conductor part of the jack is surrounded by an insulating ring which is divided in two parts with one part defining the insulating element and being acted upon by the pressing screw while the other part supports the inner conductor part of the jack and is provided as abutment against the force exerted by the pressing screw.

Since being provided as abutment, the lower half of the insulating ring should have sufficient strength. Dielectrics for that purpose have a comparably high dielectric constant so that it is suitable for maintaining a constant characteristic impedance to make the upper half of the insulating ring of a different material with a low dielectric constant.

Since a constant characteristic impedance can be maintained when providing the inner diameter of the outer conductor with an enlargement in accordance with the greater outer diameter of the inner conductor part defining the jack, according to a further feature of the present invention, the enlargement is defined by an annular groove in which the insulating ring is retained and guided.

A coaxial-line connector according to the invention is also suitable for connecting two coaxial cables. In this case, the ends of the inner conductor part of the jack are identically designed with respective pressing screws so that each end of the inner conductor part is adapted for receiving a respective cable inner conductor.

BRIEF DESCRIPTION OF THE DRAWING

The above and other objects, features and advantages of the present invention will now be described in more detail with reference to the accompanying drawing in which.

DESCRIPTION OF THE PREFERRED EMBODIMENTS

Figure 1:
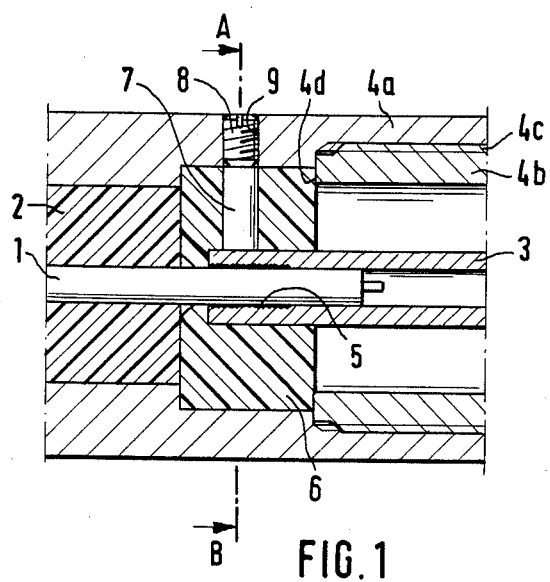
FIG. 1 is a schematic and simplified cross sectional view of a first embodiment of a coaxial-line connector according to the invention.
Figure 1A:
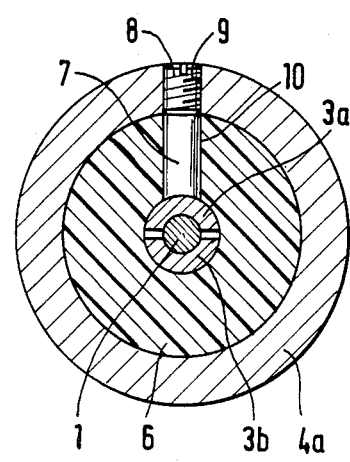
FIG. 1a is a cross sectional view of the coaxial-line connector taken along the line A—B in FIG. 1.

Referring firstly to FIGS. 1 and 1a which show different cross sectional views of a first embodiment of a coaxial-line connector in accordance with the invention, it can be seen that the connector includes an inner conductor part 3 in form of a jack which extends within a two-part outer conductor 4a, 4b. The two parts of the outer conductor 4a, 4b are connected to each other via a threaded portion 4c. The end of a coaxial cable is introduced from the left with a plug-type inner conductor 1 being inserted in the inner conductor part 3. A dielectric 2 surrounds the inner conductor part 3 to separate the latter from a cable outer conductor which for ease of illustration is, however, not illustrated.

The inner conductor part 3 is divided by axis parallel slots into two segments 3a and 3b (see FIG. 1a) which may be of suitable radially resilient material. In order to increase the tensile strength of the connection between the inner conductor jack 3 and the inner conductor 1, the inside surface of the segments 3a, 3b includes transverse grooves 5 which may be provided for example by cutting a thread into the inner conductor jack 3.

As is shown in FIG. 1, the outer conductor part 4a is step-shaped and cooperates with the outer conductor part 4b in such a manner that an annular recess 4d is defined in which a ring 6 of insulating material is arranged. The insulating ring 6 includes a central axial borehole for supporting the inner conductor part 3 and maintaining the latter in a central alignment and is provided with a radial bore 10 which receives a pin 7 made of insulating material e.g. ceramic material and being guided in the bore 10 for longitudinal displacement. With its inner end, the pin 7 bears against the upper segment 3a of the inner conductor part 3 while its other outer end which is essentially flush with the circumferential area of the insulating ring 6 is in contact with a pressing screw e.g. a setscrew 8. The setscrew 8 is disposed in a threaded bore 9 which is arranged within the outer conductor part 4a, and in alignment with the bore 10.

By suitably turning the setscrew 8, the pin 7 is displaced within the bore 10 so that the pressure exerted by the pin 7 on the inner conductor jack 3 can be adjusted thereby controlling the clamping force by which the jack 3 clamps the inner conductor 1.

In case it is desired to connect two coaxial cables, the connector as shown in FIGS. 1 and 1a is continued to the right in mirror symmetrical manner so as to allow a respective inner conductor to be inserted into the jack from the right hand side whereby the clamping force is provided by pressing screws arranged in same manner in the outer conductor which connects the cable outer conductors. It is also conceivable to allow the inner conductor part 3 to be connected to an inner conductor plug pin of e.g. a coaxial connector.

Figure 2:
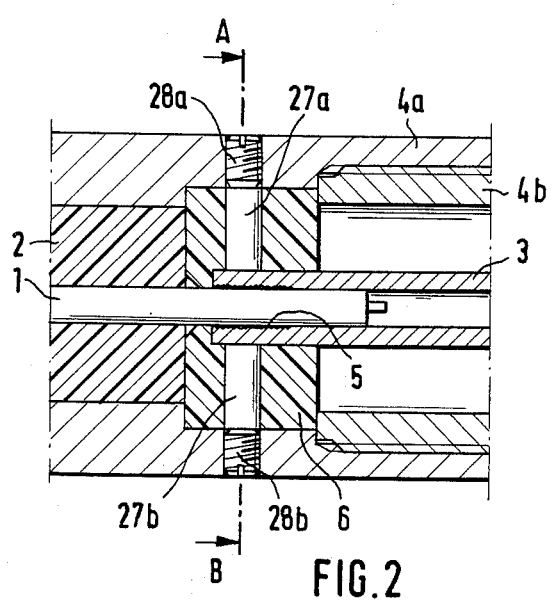
FIG. 2 is a schematic and simplified cross sectional view of a second embodiment of a coaxial-line connector according to the invention.
Figure 2A:
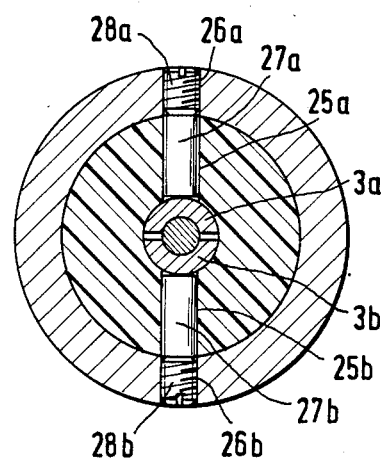
FIG. 2a is a cross sectional view of the coaxial-line connector of FIG. 2 taken along the line A—B in FIG. 2.

FIGS. 2 and 2a show cross sectional views of a second embodiment of a coaxial-line connector in accordance with the invention which differs from the first embodiment in that the clamping force as exerted on the inner conductor part 3 is applied symmetrical to the segments 3a, 3b. Accordingly, the insulating ring 6 is provided with opposing radial bores 25a, 25b guiding respective pins 27a, 27b of suitable insulating material like ceramic material for axial displacement. In alignment with the bores 25a, 25b, the outer conductor 4a includes threaded boreholes 26a, 26b which receive respective setscrews 28a, 28b exerting pressure on the pins 27a, 27b for controlling the clamping force onto the segments 3a, 3b.

The embodiment as illustrated in FIGS. 2 and 2a is especially suitable in case the insulating ring 6 is of relatively soft dielectric or made of a dielectric with a tendency for cold flow.

Figure 3:
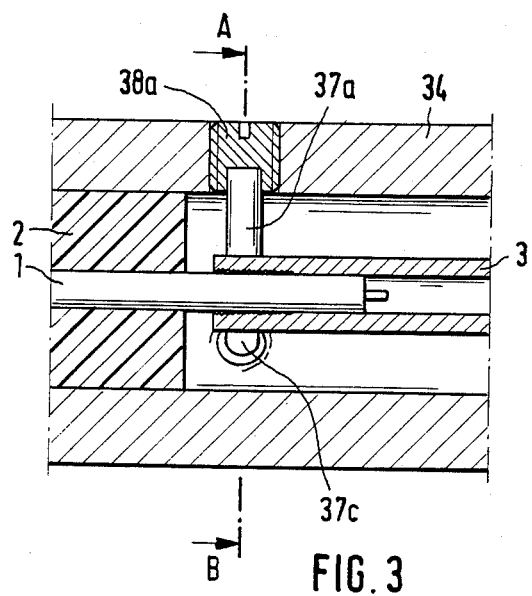
FIG. 3 is a schematic and simplified cross sectional view of a third embodiment of a coaxial-line connector according to the invention.
Figure 3A:
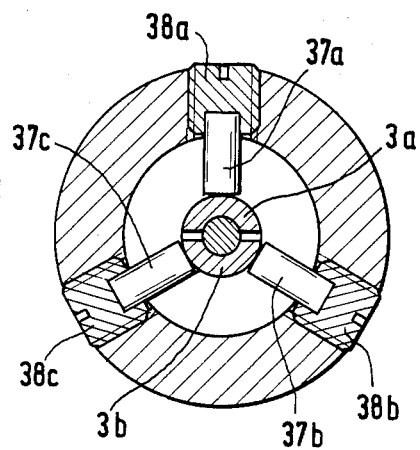
FIG. 3a is a cross sectional view of the coaxial-line connector of FIG. 3 taken along the line A—B in FIG. 3.

FIGS. 3 and 3a show a third embodiment of a coaxial-line connector in which the clamping force exerted onto the inner conductor jack 3 is provided by three setscrews 38a, 38b, 38c in cooperation with three pins 37a, 37b, 37c of insulating material as e.g. plastic material. The pins 37a, 37b, 37c are uniformly spaced about the circumference of the inner conductor part 3 and their outer end portions are connected inforce-locking manner with the respective setscrews 38a, 38b, 38c which extend in suitable radial bores of the outer conductor 34. Preferably, the pins 37a, 37b, 37c are glued into the setscrews 38a, 38b, 38c which are preferably made of metal and have a width corresponding to the thickness of the outer conductor 34.

Since the centering of the inner conductor part 3 is attained by the pins 37a, 37b, 37c as long as the setscrews 38a, 38b, 38c are uniformly tightened, the coaxial-line connector according to this embodiment does not require an insulating ring. Also, the outer conductor 34 can be made of one part and with uniform inner diameter in contrast to the step-shaped inner diameter of the preceding embodiments because the omission of the dielectric in the area of the inner conductor part 3 is about compensated by its greater diameter with regard to the characteristic impedance.

Figure 4:
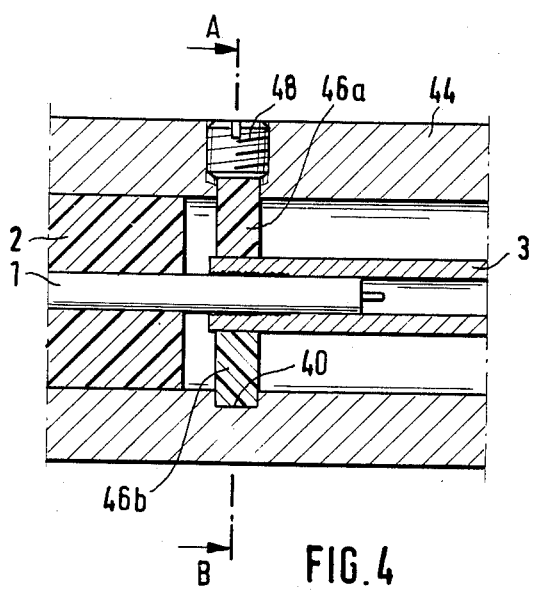
FIG. 4 is a schematic and simplified cross sectional view of a forth embodiment of a coaxial-line connector according to the invention.
Figure 4A:
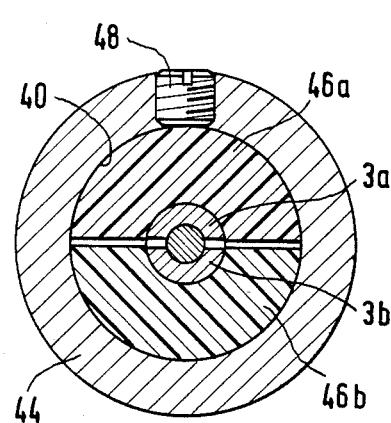
FIG. 4a is a cross sectional view of the coaxial-line connector of FIG. 4 taken along the line A—B in FIG. 4.

Turning now to FIGS. 4 and 4a, there is shown a forth embodiment of a coaxial-line connector in which the inner conductor part 3 is supported at its inner end by a ring of insulating material which is divided in an upper half 46a and a lower half 46b and is arranged in an annular groove 40 of the outer conductor 44. Acting on the outer end of the upper half 46b is a setscrew 48 which is provided in a respective bore in the outer conductor 44. By suitably turning the setscrew 48 and providing the lower half 47b as abutment for the inner conductor part 3 i.e. its segment 3b, the clamping force onto the segment 3a is adjustable due to the displacement of the upper half 46b by e.g. some tenth of a millimeter. As shown in FIG. 4a, the insulating ring is divided into the upper and lower halves 46a, 46b along an axis which is perpendicular to the longitudinal axis as defined by the setscrew 48.

The provision of the lower half 46b as abutment for the inner conductor part 3 requires that the lower half 46b is made of a plastic material of relatively great strength. However, since such plastic materials usually have a greater dielectric constant than softer or lighter plastic materials, the upper half 46a of the insulating ring is preferably made of a plastic material with a sufficiently low dielectric constant so that neither a variation of the characteristic impedance is obtained nor a considerable increase of the inner diameter of the outer conductor 44 in this area for compensating reasons is required. The asymmetry of the field caused by connecting differing dielectrics is without any negative influence because of the small axial thickness of the insulating ring.

The annular groove 40 in the outer conductor 44 apart from serving as guidance of the upper half 46a of the insulating ring is provided for compensation of the capacitive component caused through both dielectrics.

While the invention has been illustrated and described as embodied in a Coaxial-Line Connector, it is not intended to be limited to the details shown since various modifications and structural changes may be made without departing in any way from the spirit of the present invention.

What is claimed as new and desired to be protected by Letters Patent is set forth in the appended claims:

1. A coaxial-line connector; comprising:
a jack having an outer conductor and an inner conductor part divided in at least two segments and arranged in said outer conductor, said segments clamping a plug-type inner conductor; and
pressing means extending radially through said outer conductor for exerting a radial clamping force on said segments, said pressing means being accessible for allowing adjustment of the clamping force.

2. A connector as defined in claim 1 wherein said inner conductor part of said jack is provided at an inner surface with transverse grooves.

3. A connector as defined in claim 1 wherein said segments are made of radially resilient material.

4. A connector as defined in claim 1 wherein said inner conductor part defines an axis and is divided in said segments by slots extending parallel to said axis.

5. A connector as defined in claim 1 wherein said outer conductor is provided with at least one radial bore, said pressing means including a screw extending in said radial bore and acting upon said segments.

6. A connector as defined in claim 5 wherein said screw is a setscrew.

7. A connector as defined in claim 5 wherein said screw is made of insulating material.

8. A connector as defined in claim 7 wherein said screw is made of ceramics.

9. A connector as defined in claim 7, and further comprising an insulating ring surrounding said inner conductor part of said jack and having at least one radial threaded borehole in alignment with said radial bore of said outer conductor, said screw traversing said threaded borehole to act upon said segments.

10. A connector as defined in claim 5 wherein said screw is made of metal.

11. A connector as defined in claim 10 wherein said pressing means further includes an insulating element cooperating with said screw in such a manner that said screw acts upon said segments via said insulating element.

12. A connector as defined in claim 11 wherein said insulating element is a pin of insulating material which is connected to said screw in force-locking manner.

13. A connector as defined in claim 11, and further comprising an insulating ring surrounding said inner conductor part of said jack and having a radial threaded borehole in alignment with said bore of said outer conductor, said insulating element being a pin guided in said threaded borehole.

14. A connector as defined in claim 11, and further comprising an insulating ring surrounding said inner conductor part of said jack and being divided in at least two parts, said insulating element being defined by one of said parts of said divided insulating ring.

15. A connector as defined in claim 14 wherein the other one of said parts of said insulating ring supports said inner conductor part of said jack, said one part constituting said insulating element which cooperates with said screw having a lower dielectric constant than said other part of said divided insulating ring.

16. A connector as defined in claim 14 wherein said screw defines an axis, said insulating ring being divided into said parts along a diametrical axis perpendicular to said axis of said screw.

17. A connector as defined in claim 14 wherein said outer conductor has an annular groove for supporting and guiding said insulating ring.

* * * * *